(12) United States Patent
Huffman et al.

(10) Patent No.: US 8,051,314 B2
(45) Date of Patent: Nov. 1, 2011

(54) SERIAL ATA (SATA) POWER OPTIMIZATION THROUGH AUTOMATIC DEEPER POWER STATE TRANSITION

(75) Inventors: Amber D. Huffman, Banks, OR (US); Eng Hun Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 644 days.

(21) Appl. No.: 12/146,262

(22) Filed: Jun. 25, 2008

(65) Prior Publication Data

US 2009/0327773 A1 Dec. 31, 2009

(51) Int. Cl.
*G06F 1/00* (2006.01)

(52) U.S. Cl. ........ 713/323; 713/300; 713/310; 713/320; 713/330

(58) Field of Classification Search .................. 713/300, 713/310, 320–324, 330
See application file for complete search history.

(56) References Cited

U.S. PATENT DOCUMENTS

| | | | | |
|---|---|---|---|---|
| 4,747,041 A * | 5/1988 | Engel et al. | ................... | 713/324 |
| 5,404,546 A * | 4/1995 | Stewart | ........................ | 713/322 |
| 5,872,669 A * | 2/1999 | Morehouse et al. | ............ | 360/69 |
| 6,128,747 A * | 10/2000 | Thoulon | ....................... | 713/330 |
| 6,608,729 B1 * | 8/2003 | Willems et al. | ................ | 360/69 |
| 7,010,711 B2 * | 3/2006 | Bashford et al. | .............. | 713/323 |
| 7,028,199 B2 * | 4/2006 | Ayyavu et al. | ................ | 713/323 |
| 7,254,732 B2 * | 8/2007 | Bashford et al. | .............. | 713/324 |
| 7,328,356 B2 * | 2/2008 | Igari | .............................. | 713/320 |
| 7,330,989 B2 * | 2/2008 | Bashford et al. | .............. | 713/323 |
| 7,343,500 B2 * | 3/2008 | Igari | ............................. | 713/300 |
| 7,747,885 B2 * | 6/2010 | Igari | ............................. | 713/320 |
| 7,770,041 B2 * | 8/2010 | Igari | ............................. | 713/320 |
| 7,797,562 B2 * | 9/2010 | Igari | ............................. | 713/323 |
| 7,809,967 B2 * | 10/2010 | Igari | ............................. | 713/320 |
| 7,856,565 B2 * | 12/2010 | Igari | ............................. | 713/310 |
| 7,856,567 B2 * | 12/2010 | Igari | ............................. | 713/320 |
| 2006/0265617 A1 * | 11/2006 | Priborsky | ..................... | 713/320 |
| 2008/0184051 A1 * | 7/2008 | Cheong et al. | ............... | 713/323 |
| 2009/0187779 A1 * | 7/2009 | Liu et al. | ....................... | 713/323 |
| 2010/0257390 A1 * | 10/2010 | Okoge et al. | ................. | 713/320 |

OTHER PUBLICATIONS

Finisar. The Path from 3GB/s to SATA 6Gb/s: How to Migrate Current Designs to the SATA Revision 3.0 Specification. May 27, 2009.*
Serial ATA International Organization. Serial ATA Revision 2.5. Oct. 27, 2005.*
Serial ATA International Organization. SATA Power Management: It's Good to Be Green. Apr. 8, 2009.*
Intel Corporation. SATA PHY Interface Specification (SAPIS). Draft. Revision 0.90. Feb. 8, 2002.*

* cited by examiner

*Primary Examiner* — Matthew Spittle
(74) *Attorney, Agent, or Firm* — Caven & Aghevli LLC

(57) ABSTRACT

A host device and a storage device with a Serial ATA (SATA) architecture to independently transition to a deeper low power state after first entering an initial low power state without first transitioning to the Active state. The transition from the Partial state to the Slumber state is direct and the transition may be enabled, but not negotiated through a handshaking process.

20 Claims, 2 Drawing Sheets

SERIAL ATA (SATA) POWER OPTIMIZATION THROUGH AUTOMATIC DEEPER POWER STATE TRANSITION

Developments in a number of different digital technologies have greatly increased the need to transfer data from a processing device across an interface for storage. Storage systems today come with massive throughput capacity and performance capabilities to handle the data that comes their way. The storage systems have a high data transfer rate for both read and write functions to maintain overall system performance and provide the necessary sustained performance to support for the high-speed network connectivity provided by storage systems at work today.

Some mechanisms are currently in place to provide power-management capabilities that reduce power in idle conditions of both the processing device and the storage device, but those mechanisms are limited. One notable issue that needs resolution that would lead to additional power savings involves the coordination of state transitions within the hierarchy of power levels.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
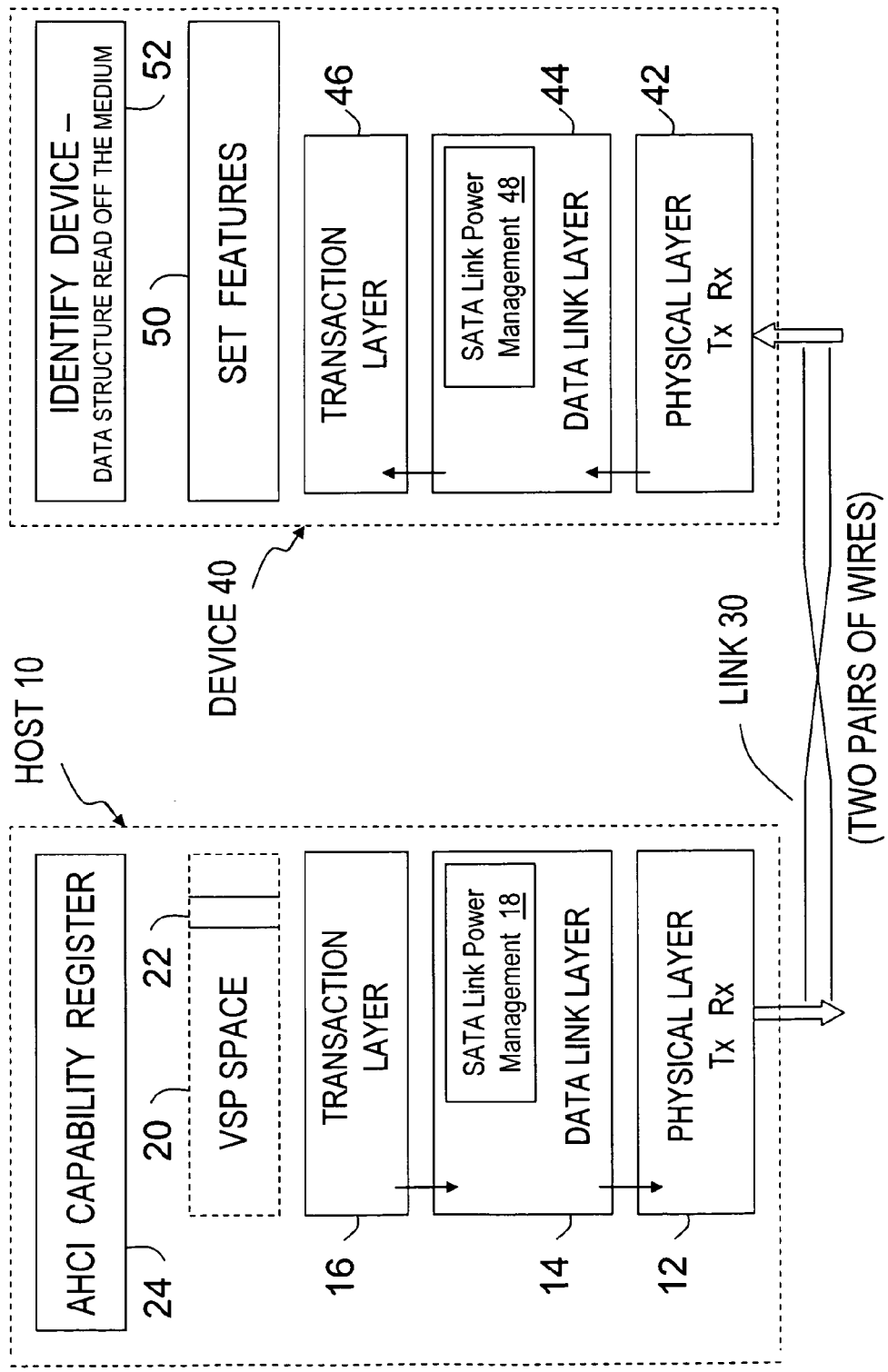
FIG. 1 is a block diagram that illustrates a protocol architecture that generates and transfers a transaction layer packet across a link between a host and a device.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

FIG. 1 is a simplistic embodiment of a host processing device 10 with a point-to-point link 30 to transfer and share data with a device 40. Device 40 may be a storage device such as, for example, a hard disk, solid state drive, or an optical drive while link 30 is a computer bus that resides between a physical layer 12 on the host side and a physical layer 42 on the device side. In the Serial ATA (SATA) architecture this computer bus is a data-connection formed by two pairs of unidirectional signal wires that provide high signaling rates through Low Voltage Differential Signaling (LVDS). Thus, a SATA device 40 has a link to a SATA host-port, with no sharing of cable or bandwidth with other devices.

Above the SATA physical level is a data link layer 14 and a transaction layer 16 on the host side, and a data link layer 44 and a transaction layer 46 on the device side. These higher levels convert configuration and data-operations into discrete ordered packets for transmission over the high-speed serial link 30. Specifically, physical layers 12 and 42 gather data bits from the data link layers for transmission; the data link layers 14 and 44 provide packet protection and packet error detection and correction.

The standard interface for SATA host controllers is the Advanced Host Controller Interface (AHCI) which provides enhanced performance features and enables additional power-management capability over the base SATA specification. Both the host device 10 and device 40 include link power management based on Serial ATA that reduces power in idle SATA conditions and further limits the power consumption of the interface. Accordingly, host device 10 includes a SATA Link Power Management 18 and device 40 includes a SATA Link Power Management 48.

Figure 2:
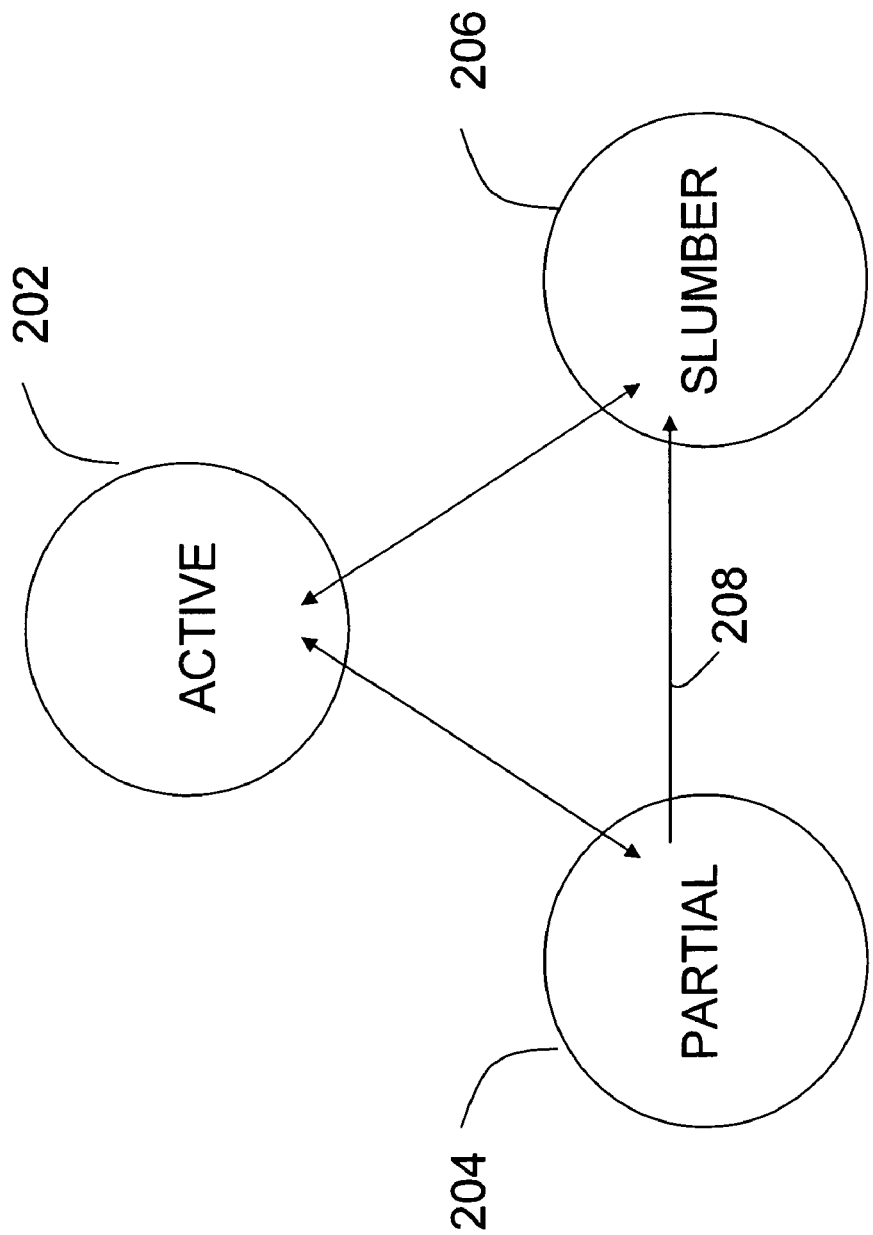
FIG. 2 is a diagram that illustrates SATA power state transitions in accordance with the present invention.

FIG. 2 illustrates the SATA power state transitions from the power management levels of Active (denoted by reference number 202), Partial (denoted by reference number 204) and Slumber (denoted by reference number 206). It should be pointed out that the Serial ATA specification does not have a mechanism that allows direct transitions from the Partial state to the Slumber state. Therefore, FIG. 2 does not represent the active transitions permitted in the Serial ATA specification, but rather the active transitions permitted in accordance with the present invention. As limited by the Serial ATA specification, a transition from the Partial state to the Slumber state must take an indirect route, first transitioning from the Partial state to the Active state and then further transitioning to the Slumber state. However, operation of the device while in the Active state burns power and the act of bringing the link to the Active state may use more power than what is saved in transitioning from the Partial state to the Slumber state, assuming the time the device spends operating in the Slumber state is short. Additionally, power management transitions are negotiated, so after transitioning to the Active state the device may decline/NAK entry into the Slumber state, a situation that is worse that staying in the Partial state.

Contrary to the Serial ATA specification and as shown in FIG. 2, the present invention provides a direct transition shown as link 208 from the Partial state 204 where there is no traffic on the interface and the bus is quiescent to the Slumber state 206 that provides a deeper power savings. Thus, one feature of the present invention is that both host device 10 and device 40 may independently transition directly from the Partial state 204 to the Slumber state 206 without communication to the opposite side about the pending negotiation or transition. Again, the direct transition from the Partial state 204 to the Slumber state 206 eliminates the intermediate transition to the Active state 202.

The Partial state is designed to allow link power state transitions continually with minimal impact on performance. The Slumber state is designed for use when the link is expected to be idle for an extended period of time. It should be noted that the Partial state has an exit latency of 10 microseconds whereas the Slumber state has an exit latency of 10 milliseconds. However, this exit latency is a maximum and in order to make good use of the Slumber state an exit latency less than 10 milliseconds may be used to optimize designs. The longer exit latency in the Slumber state allows a Phase Lock Loop (PLL) to be turned off to provide a power savings of up to a few hundred milliwatts which is a crucial savings to the platform.

The SATA specification includes SATA link power management as host initiated link power management commands and as device initiated link power management commands.

The SATA specification allows either the host or the device to request a transition to enter a low-power state, but the corresponding host or device must accept or reject the link state change request. The request is signaled by transmitting a PMREQ_P primitive to request a transition to the Partial power state or a PMREQ_S primitive to transition to the Slumber power state. The corresponding host or device must then respond with an acknowledge or a negative acknowledge primitive. If the request is acknowledged then both the host and the device transition into the corresponding power state.

In contrast to transmitting the primitives to request the power state transitions and to avoid the handshaking, the present invention enables host device 10 and device 40 to independently transition from the Partial state 204 directly to a deeper power state, e.g. the Slumber state 206, without requesting the transition and waiting for the handshaking from the other device. Each side of the interface allows for the other side to have extended recovery time from the low power state, even if the originally negotiated state is Partial.

Host device 10 and device 40 each have capability bits that indicate whether a direct transition from the Partial state to the Slumber state via link 208 is supported. The host capability may be defined in the host controller register space and the device capability is specified in a word IDENTIFY DEVICE 52 read off the medium. In addition, host device 10 and device 40 also have a disable/enable register bit to ensure that the transition via link 208 was only enabled when the other side could tolerate the longer exit latency from the Partial state. A host enable/disable bit 22 is specified in the host controller register space, whereas a device enable/disable is determined by a SET FEATURES command 50.

In one embodiment register settings may be provided to set a minimum recommended time that elapses before initiating the transition from Partial state 204 to Slumber state 206. Host device 10 uses the Partial state to allow a quick recovery to command processing when there has only been a short idle time from the user. Rather than using a timer to signal a state transition, an alternative embodiment may use a transition by the processor going to a particular C state to trigger the transition from Partial state 204 to Slumber state 206. Host device 10 and device 40 typically have different lengths of time before being considered idle, so these devices are ready to go to a deeper power state at different times. The register providing the minimum recommended time would allow the host to optimize the time at which the host and device transition to a lower power state.

By now it should be apparent that embodiments of the present invention allow additional power savings to be achieved while not sacrificing performance if the idle period is short (retaining the value of going to the Partial state first). The host and device transition to a deeper low power state independently after first entering an initial low power state. The host device can also control the time point at which the state transition should be made.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A processing and storage system, comprising:
a host processor;
a storage device; and
an interface between the host processor and the storage device, wherein the host processor and the storage device directly transition from a Partial power state to a Slumber power state to further reduce power, wherein the Slumber power state is a lower power than the Partial power state, wherein the host processor further comprises: a register to store capability bits to indicate whether a transition from the Partial power state to the lower power than the Partial power state is supported or a register to store an enable/disable bit to ensure that the transition is enabled when the storage device can tolerate a longer exit latency.

2. The system of claim 1 wherein the host processor controls the time at which the transition is made.

3. The system of claim 1 wherein the host processor and the storage device transition between the Partial power state and the Slumber power state without a handshaking process to negotiate the transition.

4. The system of claim 1 wherein the host processor further comprises a register to set a minimum recommended time that elapses before initiating the transition.

5. The system of claim 1 wherein the interface includes a computer bus between a physical layer on the host processor and a physical layer on the storage device, the computer bus being a data-connection formed by two pairs of unidirectional signal wires that provide signaling rates through Low Voltage Differential Signaling (LVDS).

6. A Serial ATA (SATA) interfaced system, comprising:
a host processor;
a memory device; and
an interface bus between the host processor and the memory device, where the host processor and the memory device independently transition from a partial state directly to a slumber state without requesting the transition and without waiting for handshaking to negotiate the transition, wherein the host processor is to comprise a register to set a minimum recommended time before initiating the transition, the host processor is to initiate the transition immediately based on a system specific event independent of the minimum recommended time, and the system specific event is a processor C state transition.

7. The SATA interfaced system of claim 6 wherein the host processor and the memory device first enter the partial state as an initial low power state, then independently transition to the slumber state as a deeper low power state.

8. The SATA interfaced system of claim 6 wherein the host processor further comprises a register to store a bit to enable/disable the transition.

9. A processor and storage device, comprising:
a data-connection of two pairs of unidirectional signal wires to provide an interface between the processor and the storage device, where the processor and the storage device independently transition from a partial state as an initial low power state directly to a slumber state as a deeper low power state without first passing through an active state, wherein the processor and the storage device include capability information to indicate whether the transition from the partial state to the slumber state is supported.

10. The processor and storage device of claim 9 wherein the processor and the storage device transition between the partial state and the slumber state without waiting for handshaking to negotiate the transition.

11. The processor and storage device of claim 9 wherein the processor initiates the transition based on a system specific event independent of a minimum recommended time.

12. A processing device having an interface to a storage device, comprising:
  a data port to connect to the storage device via two pairs of unidirectional signal wires that have no traffic on the interface with the processing device in a partial state that directly transitions to a slumber state without first passing through an active state,
  wherein the processor includes capability information to indicate whether the transition to the slumber state is supported.

13. The processing device of claim 12 wherein the processor is enabled to directly transition from the partial state to the slumber state without negotiation with the storage device through a handshaking process.

14. The processing device of claim 12 wherein the processor stores a bit to enable or disable the transition.

15. A storage device having an interface to a processing device, comprising:
  a data port to connect to the processing device via two pairs of unidirectional signal wires that have no traffic on the interface with the storage device in a partial state that directly transitions to a slumber state without first passing through an active state, wherein the processing device and the storage device include capability information to indicate whether the transition from the partial state to the slumber state is supported.

16. The storage device of claim 15 wherein the storage device is enabled to directly transition from the partial state to the slumber state without negotiation with the processing device through a handshaking process.

17. The storage device of claim 15 wherein the processing device initiates the transition based on a system specific event independent of a minimum recommended time.

18. A method comprising:
  coupling a host processor and a memory device via a bus;
  the host processor and the memory device to independently transition from a partial state directly to a slumber state without requesting the transition and without waiting for handshaking to negotiate the transition; and
  setting a minimum recommended time before initiating the transition, the host processor to initiate the transition based on a system specific event independent of the minimum recommended time, wherein the system specific event is a processor C state transition.

19. The method of claim 18 wherein the host processor and the memory device are to first enter the partial state as an initial low power state, then independently transition to the slumber state as a deeper low power state.

20. The method of claim 18 further comprising storing a bit to enable or disable the transition.

* * * * *